United States Patent [19]
Serrano

[11] 4,106,341
[45] Aug. 15, 1978

[54] LINEARIZED THERMISTOR TEMPERATURE MEASURING CIRCUIT

[75] Inventor: Juan de J. Serrano, Louisville, Ky.

[73] Assignee: General Electric Company, Louisville, Ky.

[21] Appl. No.: 756,233

[22] Filed: Jan. 3, 1977

[51] Int. Cl.² ............................................. G01K 7/24
[52] U.S. Cl. .............................................. 73/362 AR
[58] Field of Search ................. 73/362 AR, 362 SC; 307/310

[56] References Cited

U.S. PATENT DOCUMENTS

| | | | |
|---|---|---|---|
| 3,440,883 | 4/1969 | Lightner | 73/362 |
| 3,517,556 | 6/1970 | Barker | 73/362 AR |
| 3,688,581 | 9/1972 | Le Quernec | 73/362 AR |
| 3,808,469 | 4/1974 | Raymond et al. | 307/308 |
| 3,839,647 | 10/1974 | Simmons | 307/310 X |
| 3,934,476 | 1/1976 | Lamb, | 73/362 AR |

Primary Examiner—Jerry W. Myracle
Attorney, Agent, or Firm—Steven C. Schnedler; Francis H. Boos

[57] ABSTRACT

A substantially constant voltage is maintained across a negative temperature coefficient thermistor having an exponential resistance-temperature characteristic. The resultant current through the thermistor is an exponential function of sensed temperature. In response to this current through the thermistor, current is supplied to a forwardly biased decoder diode having a corresponding exponential current-voltage characteristic so that the resultant voltage across the decoder diode is a substantially linear function of sensed temperature.

11 Claims, 3 Drawing Figures

4,106,341

LINEARIZED THERMISTOR TEMPERATURE MEASURING CIRCUIT

BACKGROUND OF THE INVENTION

1. Field Of The Invention

The present invention relates generally to a temperature measuring circuit employing a thermistor and, more particularly, to a method and a circuit for linearizing the output of a non-linear thermistor.

2. Description Of The Prior Art

It is well known to use a thermistor as a transducer for the measurement of temperature. However, commonly-available thermistors typically exhibit a non-linear coefficient of resistance change with changes in sensed temperature. In many applications, it is desirable that the voltage output of a thermistor temperature measuring circuit be a linear function of temperature. One typical prior art method for approximately linearizing thermistor output is including the thermistor in a voltage divider network with suitable fixed resistors connected both in series with and in parallel with the thermistor. Another method is employing a plurality of matched or complementary thermistors exposed to the same sensed temperature and connected so that their non-linear characteristics cancel out over a useful temperature range. However, various prior art thermistor linearizing methods and circuits have disadvantages such as difficulty of adjustment and limited operational temperature range without undue complexity.

SUMMARY OF THE INVENTION

It is an object of the invention to provide a method for accurately linearizing the output of a thermistor over a wide range of sensed temperatures.

It is another object of the invention to provide specific circuitry which implements the linearizing method.

It is another object of the invention to provide such circuitry which may readily be compensated to accurately operate over a wide range of ambient temperatures.

It is still another object of the invention to provide a linearized thermistor temperature measuring circuit which is adapted for use in a food temperature sensing probe in an electric range or a microwave oven.

These and other objects are accomplished by the present invention which linearizes the output of a thermistor of the type having an exponential resistance-temperature characteristic.

A method according to the invention contemplates maintaining a substantially constant voltage across the thermistor by controlling the current therethrough as required. Current is supplied to a forwardly biased decoder diode in response to the controlled current through the thermistor. Since the decoder diode has a current-voltage characteristic which is also exponential, the exponential resistance-temperature characteristic of the thermistor is canceled and the resultant voltage across the decoder diode is a substantially linear function of the temperature sensed by the thermistor. A particular temperature measuring circuit implementing this linearizing method includes as circuit elements a temperature sensing having an exponential resistance-temperature characteristic, means for maintaining a substantially constant voltage across the thermistor by controlling the current therethrough, a decoder diode having an exponential current-voltage characteristic, and means for supplying current to the decoder diode in response to the current through the thermistor.

In a simplified embodiment of the invention, thermistor current is supplied to the decoder diode simply by connecting the decoder diode and the thermistor in series with the decoder diode included within a voltage feedback loop which maintains the voltage across the thermistor. In an alternative embodiment, a current amplifier is employed to sense the current through the thermistor and to drive the diode in response thereto.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

DESCRIPTION OF THE PREFERRED EMBODIMENTS

Figure 1:
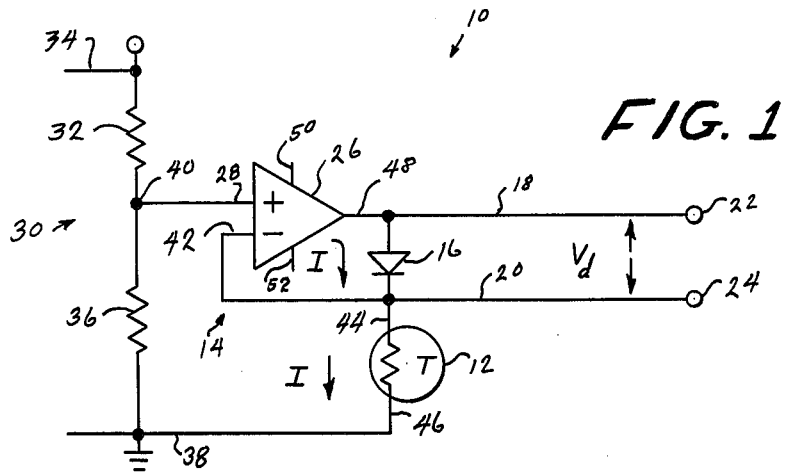
FIG. 1 is a schematic circuit diagram of a simplified embodiment of the invention.

As mentioned hereinabove, the invention contemplates maintaining a substantially constant voltage across a thermistor so that the resultant current through the thermistor is an exponential function of sensed temperature. In response to this current through the thermistor, current is supplied to a forwardly biased decoder diode having a corresponding exponential current-voltage characteristic so that the resultant voltage across the decoder diode is a substantially linear function of the temperature sensed by the thermistor. The following demonstrates why this is so:

A negative temperature coefficient thermistor of the type here concerned can be described by the following equation:

$$R_T = R_{298} \epsilon^{\beta \left( \frac{1}{T_S} - \frac{1}{298} \right)} \quad (1)$$

Where:
$R_T$ is thermistor resistance
$T_S$ is sensed temperature in ° K
$R_{298}$ is thermistor resistance at 298° K (Constant for a given thermistor)
$\beta$ is a thermistor gain factor (Constant for a given thermistor)

Then, by Ohm's law, for a fixed, constant voltage, $V_T$, across the thermistor:

$$I_T = \frac{V_T}{R_{298} \epsilon^{\beta \left( \frac{1}{T_S} - \frac{1}{298} \right)}} \quad (2)$$

Where $I_T$ is the resultant current through the thermistor.

A semiconductor diode can be approximately described by the equation:

$$I_D = I_S \epsilon^{qV_d/KT_j} \quad (3)$$

Where:
 $I_D$ is current through the diode
 $V_d$ is voltage across the diode
 $I_S$ is reverse saturation current (Constant for a given diode)
 $q$ is the electron charge constant
 $K$ is Boltzman's constant
 $T_j$ is diode junction temperature in ° K (can be assumed to be a constant)

If thermistor current is supplied to the diode:

$$I_T = I_D, \quad (4)$$

and the right sides of equations (2) and (3) can be equated:

$$I_S \epsilon^{\frac{qV_d}{KT_j}} = \frac{V_T}{R_{298}\epsilon^{\beta\left(\frac{1}{T_S} - \frac{1}{298}\right)}} \quad (5)$$

Solving equation (5) for the voltage across the diode, $V_d$:

$$V_d = \frac{KT_j \ln\left(\frac{V_T}{R_{298} I_S}\right)}{q} + \frac{KT_j\beta}{298_q} - \frac{KT_j\beta}{qT_S} \quad (6)$$

Since all relevant factors were previously stated to be constant for given components, we can simplify equation (6) by arbitrarily defining two constants, $K_1$ and $K_2$:

$$K_1 = \frac{KT_j \ln\left(\frac{V_T}{R_{298} I_S}\right)}{q} + \frac{KT_j\beta}{298q} \quad (7)$$

$$K_2 = \frac{KT_j\beta}{q} \quad (8)$$

Substituting the right sides of equations (7) and (8) into equation (6) yields the simplified expression for the voltage across the diode:

$$V_d = K_1 - \frac{1}{T_S} K_2 \quad (9)$$

Equation (9) shows that when thermistor voltage, $V_T$, is held constant, and the resultant thermistor current is supplied to a diode, then the voltage, $V_d$, across the diode is a linear function of sensed temperature, $T_S$, with a constant offset from zero and a scale factor.

Now, referring to the drawings wherein identical reference numerals designate corresponding or identical circuit elements, FIG. 1 illustrates a linearized temperature measuring circuit 10 according to a first embodiment of the invention. The circuit 10 includes a negative temperature coefficient temperature sensing thermistor 12 having an exponential resistance-temperature characteristic. A means, generally designated 14, for maintaining a substantially constant voltage, $V_T$, across the thermistor 12 is included. The voltage maintaining means 14 operates by sensing the voltage across the thermistor 12 and controlling the current to the thermistor 12 as required to maintain the desired voltage. As a result, the magnitude of controlled current required is an exponential function of the temperature sensed by the thermistor 12.

The temperature measuring circuit 10 further includes a decoder diode 16 which has the usual diode exponential current-voltage characteristic when forwardly biased. The circuit 10 also includes a means for supplying current to the decoder diode 16 in response to the current through the thermistor 12, the polarity being such to forwardly bias the decoder diode 16. In FIG. 1, this means for supplying current to the decoder diode 16 is simply a series connection of the decoder diode 16 and the thermistor 12. The resultant voltage drop $V_d$ across the decoder diode 16 is carried by conductors 18 and 20 to appear across output terminals 22 and 24. For the reasons pointed out above, provided the thermistor 12, the decoder diode 16, and the voltage maintained across the thermistor 12 are suitably selected, the output voltage appearing across the terminals 22 and 24 is a substantially linear function of the temperature sensed by the thermistor 12.

Still referring to FIG. 1, the particular voltage maintaining means 14 employed comprises a voltage feedback loop arrangement including a first operational amplifier 26 with its non-inverting (+) input 28 connected to a reference voltage source 30. The illustrated reference voltage source 30 comprises a simple resistive voltage divider including an upper resistor 32, one terminal of which is connected to a line 34 carrying a regulated DC supply voltage, and a lower resistor 36 connected to a common circuit reference point (ground) 38. The actual reference voltage appears at the intermediate tap point 40.

The actual voltage across the thermistor 12 is compared by the operational amplifier 26 to the reference voltage by means of a connection between the inverting (−) input 42 and one terminal 44 of the thermistor 12. To complete the thermistor circuit, the other thermistor terminal 46 is connected to the circuit reference point 38.

Lastly, the operational amplifier output 48 is connected (in this case, through the decoder diode 16) to the one terminal 44 of the thermistor 12 to supply the controlled current thereto which is required to maintain the voltage $V_T$ across the thermistor 12 at a value substantially equal to the reference voltage appearing at the tap point 40.

In the operation of the operational amplifier voltage feedback loop arrangement illustrated, the connection between the one thermistor terminal 44 and the inverting (−) input 42 will be understood to comprise a negative voltage feedback path. If, for example, the voltage at the thermistor terminal 44 falls below the reference voltage at the tap point 40, the operational amplifier inverting (−) input 42 is more negative than the non-inverting (+) input 28, with the result that the output at 48 increases, supplying increased current to the thermistor 12, resulting in an increased voltage thereacross. If, on the other hand, the voltage at the thermistor terminal 44 exceeds the reference voltage appearing at the tap point 40, then the voltage at the operational amplifier inverting (−) input 42 is more positive than the voltage at the non-inverting (+) input 28, with the result that the output at 48 decreases, supplying less current to the thermistor 12, decreasing the voltage thereacross.

It will be apparent that the operation as described is a conventional voltage regulating action and, as a result, current is constantly changing as required. In particular, as the temperature sensed by the thermistor 12 increases, its resistance decreases, and this tends to reduce the voltage across the thermistor 12, except that in response, the operational amplifier arrangement immediately supplies increased current to the thermistor 12, maintaining its voltage as before.

The first operational amplifier 26 further includes conventional positive and negative supply voltage connections 50 and 52, which may for example be connected to the supply voltage line 34 and the circuit reference point 38, respectively.

In FIG. 1, the current supplied through the thermistor 12 is designated I. Since the decoder diode 16 is connected in series with the thermistor 12, the current I also flows through the decoder diode 16. Due to the extremely high input impedance of the first operational amplifier 26, current flow between the inverting (−) input 42 and the thermistor terminal 44 is negligible, and as a practical matter does not disturb the identity of currents flowing through the decoder diode 16 and the thermistor 12.

Figure 2:
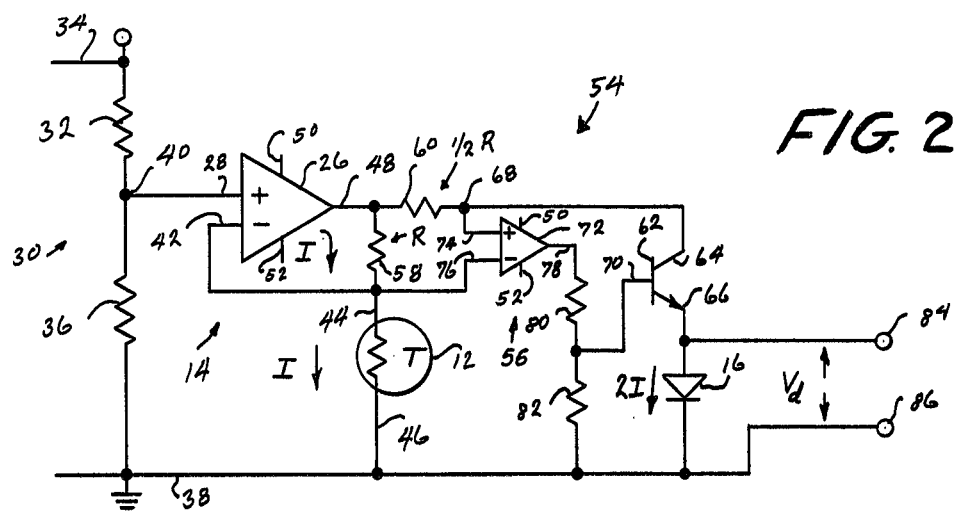
FIG. 2 is a schematic circuit diagram of an alternative embodiment of the invention which includes a current amplifier to drive the decoder diode.

Before referring to FIG. 2, two deficiencies in the simplified circuit of FIG. 1 will be mentioned. First, neither terminal of the decoder diode is grounded and thus both the output terminals 22 and 24 are floating. Depending upon the particular external circuitry, it may be more convenient if one of the output terminals 22 or 24 is grounded. A second deficiency in the circuit 10 of FIG. 1 is that the current flowing through the decoder diode 16 is substantially identical to the current flowing through the thermistor 12. Depending upon the characteristics of the particular decoder diode 16 and the thermistor 12 employed, better linearity may result if a constant multiplying or scale factor is employed. It will be apparent that both of these shortcomings are due to the simplified nature of FIG. 1, which although it may not be particularly suitable for practical application, serves well to illustrate the principles of the invention.

Referring now to FIG. 2, another form of linearized thermistor temperature sensing circuit 54 according to the invention is illustrated. For convenience of description, those circuit elements of FIG. 2 corresponding to circuit elements in FIG. 1 are designated with like reference numerals and a particular description thereof is not repeated. For a more direct understanding, the description which follows is for the most part confined to the differences between the two circuits 10 and 54.

In FIG. 2, the means for supplying current to the decoder diode 16 comprises a current amplifier generally designated at 56. The current amplifier 56 includes a first resistor 58, having a representative resistance value R, connected in series between the operational amplifier output 48 and the one terminal 44 of the thermistor 12. The first resistor 58 and the thermistor 12 together comprise a first current path. The circuit 54 additionally includes a second resistor 60 having a resistance value one-half that of the first resistor 58 (hence represented by the expression ½ R), having one terminal connected to the operational amplifier output 48. A pass transistor 62 has its collector and emitter terminals 64 and 66 connected in series between the other terminal 68 of the resistor 60 and the decoder diode 16. The second resistor 60, the pass transistor 62, and the decoder diode 16 together comprise a second series current path. As indicated by the arrow labeled 2I adjacent the decoder diode 16, the current flowing in this second path and therefore the current through the decoder diode 16 is twice that of the current I flowing through the thermistor 12. This relationship is achieved and maintained by varying the effective collector-emitter resistance of the pass transistor 62 by varying the current supplied to the transistor base terminal 70 as required.

A second operational amplifier 72 compares the voltage drops across the first and second resistors 58 and 60 and supplies an appropriate current to the transistor base 70 to maintain the voltage drops across the two resistors 58 and 60 equal. Since the voltage drops are maintained equal and since the second resistor 60 is selected to have one-half the resistance of the first resistor 58, then it follows from Ohm's law that the second resistor 60 carries twice the current as the first resistor 58. Therefore, so long as the voltage drops across the resistors 58 and 60 are maintained substantially equal, then the desired two-to-one relationship between the current flowing through the decoder diode 16 and the current flowing through the thermistor 12 is maintained.

To accomplish this, the non-inverting (+) input 74 of the second operational amplifier 72 is connected to the other terminal 68 of the resistor 60, and the inverting (−) input 76 is connected to the junction of the resistor 58 and the thermistor 12. The operational amplifier output 78 is connected through a suitable voltage divider biasing network comprising resistors 80 and 82 to the pass transistor base terminal 70. In response to the relationship of the voltages applied to its input terminals 74 and 76, the second operational amplifier 72 supplies a suitable bias voltage to result in the desired current through the pass transistor 62 and therefore through the decoder diode 16.

It will be apparent in the circuit 54 of FIG. 2 that since twice as much current flows from the operational amplifier output 48 through the second resistor 60 as flows through the first resistor 58 and the thermistor 12, that considerably more output current capability from the first operational amplifier 26 is required. However, assuming that it is operated within its current capability, the operation of the voltage maintaining means 14 is substantially undisturbed, and the desired constant voltage is maintained across the thermistor 12.

In the circuit illustrated in FIG. 2, an arbitrary two-to-one current multiplying factor was selected. It will be apparent that through a suitable selection of the ratios of the first and second resistors 58 and 60, any desired current ratio may be selected to properly match a particular thermistor 12 and the decoder diode 16. Specifically, the ratio of the resistance of the first resistor 58 to the resistance of the second resistor 60 determines the current multiplying factor. If desired, a current gain of less than one may equally well be employed if warranted. It will further be apparent that the output terminals 84 and 86 of the circuit 54 are now referenced to ground potential, the output terminal 86 being connected to the circuit reference point 38. This latter characteristic may be advantageous to accommodate particular external circuitry.

Figure 3:
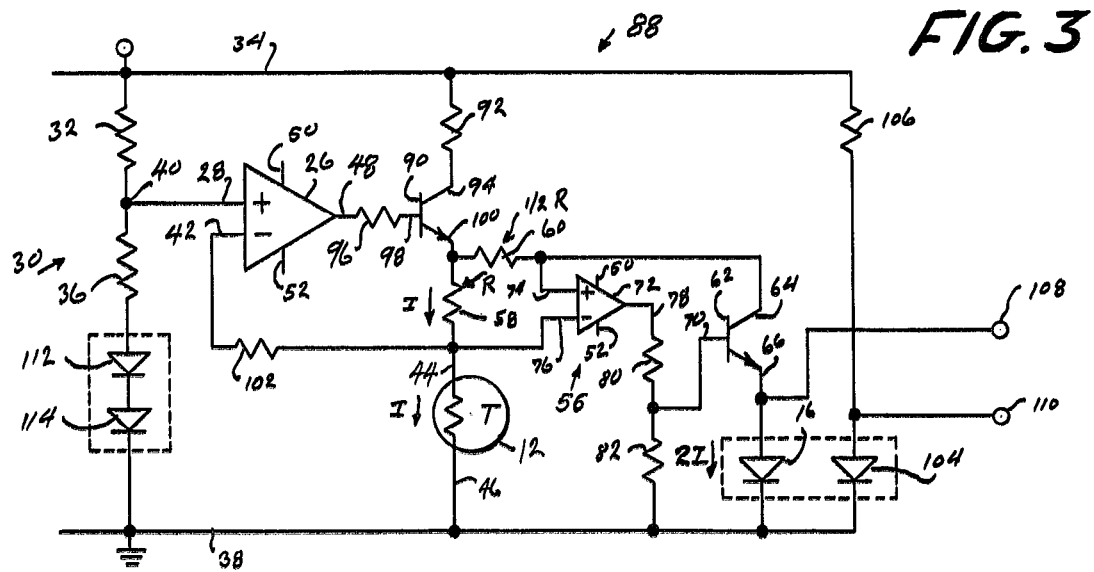
FIG. 3 is a schematic circuit diagram of another alternative embodiment of the invention which further includes a reference diode which provides a differential voltage output and includes means for compensating for ambient temperature variations.

Referring lastly to FIG. 3, a third circuit embodiment 88 is shown which, for convenience, will be described in terms of its differences from the circuit of FIG. 2, with identical or corresponding certain elements being designated by identical reference numerals and not further described. The two primary additions to the circuit of FIG. 3 are a differential voltage output circuit and compensation for ambient temperature variations. Further, in order to enable the use of a commercially available operational amplifier at 26, an external NPN output transistor 90 has been added following the output terminal 48 to enhance the current supplying capabilities thereof.

Considering first the circuitry associated with the output amplifying transistor 90, it is generally connected in an emitter follower configuration with a resistor 92 connected between the regulated DC supply line 34 and the collector terminal 94, and a current limiting resistor 96 connected between the operational amplifier output terminal 48 and the transistor base terminal 98. The transistor emitter terminal 100 then serves as the output of what amounts to simply an operational amplifier circuit having increased output current capabilities. To avoid damaging the input of the first operational amplifier 26, a resistor 102 is connected in series between the one thermistor terminal 44 and the inverting (−) terminal 42. Since the additional transistor 90 is within the operational amplifier voltage feedback loop, any non-linearity added thereby is compensated for by means of the negative feedback path through the resistor 102 back to the inverting (−) input 42.

In order to stabilize the output of the circuit 88 and additionally to provide a differential output to eliminate a DC offset in the output, a reference diode 104 is included. The reference diode 104 has a fixed forward bias accomplished by a suitable resistor 106 connected between the regulated DC supply voltage line 34 and one terminal of the reference diode 104. The other terminal of the reference diode 104 is connected to the circuit reference point 38. For best results, the decoder diode 16 and the reference diode 104 should have substantially identical characteristics. To accomplish this, they are both constructed on a single monolithic chip within what is commonly known as an integrated circuit package. Circuit output terminals 108 and 110 are connected to the anodes of the decoder diode 16 and the reference diode 104, respectively. These may be connected to a suitable external linear differential amplifier.

The formation of the decoder diode 16 and the reference diode 104 on a single chip ensures that their junction temperatures are approximately equal. The junction temperatures will depend not only on the current supplied to the decoder diode 16, but will depend upon the ambient temperature as well. In the mathematical discussion above, the diode junction temperature $T_j$ was treated as a constant. In fact, the diode junction temperature depends not only on self-heating effects of the decoder diode 16 but also upon the ambient temperature. In order to further compensate for ambient temperature variations so that the circuit 88 may be used over a wide range of temperatures, a pair of diodes 112 and 114 are forwardly biased and associated with the voltage maintaining means 14 to slightly vary the substantially constant thermistor voltage $V_T$ as ambient temperature varies. More specifically, the diodes 112 and 114 are connected in the reference voltage divider 30 in series with the lower resistor 36 so that as ambient temperature rises as sensed by the diodes 112 and 114 the reference voltage at the tap point 40 decreases. With a suitable trial and error selection of the resistors 32 and 36 and of the diodes 112 and 114, suitable ambient temperature compensation can be achieved.

The Table below lists exemplary component values which were used in an embodiment of the invention constructed in accordance with FIG. 3 which achieved a linearity of better than 3% for sensed temperatures from room temperature up to 250° F. and compensated for ambient temperatures up to 200° F.

Resistors

32: 1 Meg. ohms
36: 8.2 K ohms fixed plus 5 K ohms variable
58: 3000 ohms
60: 1500 ohms
80: 220 K ohms
82: 47 K ohms
96: 10 K ohms
102: 1.5 K ohms
106: 470 K ohms Thermistor

12: National Industries catalog number 2H-103; 10,000 ohms at 25° C.

Operational Amplifiers

26: National LM 324
72: National LM 324

Transistors

62: 2N3417
90: 2N3417

Diodes

16, 104, 112, 114: All parts of RCA CA3183E transistor array, with emitter-base terminals shorted.

Thermistor Voltage

Set at 1.44 V.D.C.

It will be apparent therefore that the present invention provides a highly effective thermistor-type linearized temperature sensing circuit. Linearization is achieved over a relatively wide range of sensed temperatures and accuracy of the circuit is maintained over wide variations in ambient temperature.

While specific embodiments of the invention have been illustrated and described herein, it is realized that modifications and changes will occur to those skilled in the art. It is, therefore, to be understood that the appended claims are intended to cover all such modifications and changes as fall within the true spirit and scope of the invention.

What is claimed is:

1. A linearized temperature measuring circuit comprising:
   a temperature sensing thermistor having an exponential resistance-temperature characteristic;
   feedback circuit means for maintaining a substantially constant voltage across said thermistor by sensing the voltage thereacross and controlling current therethrough as required to maintain the substantially constant voltage, said feedback means including connections to the two terminals of said thermistor to sense the voltage thereacross, the magnitude of current required thereby being an exponential function of sensed temperature;
   a decoder diode having an exponential current-voltage characteristic when forwardly biased; and
   means for supplying current to said decoder diode in response to the current through said thermistor, the polarity being such to forwardly bias said decoder diode;

whereby the resultant voltage across said decoder diode is an exponential function of current therethrough, and a substantially linear function of sensed temperature.

2. A temperature measuring circuit according to claim 1, wherein said thermistor has a negative temperature coefficient.

3. A temperature measuring circuit according to claim 1, wherein said means for supplying current to said decoder diode comprises a series connection of said decoder diode and said thermistor.

4. A temperature measuring circuit according to claim 1, wherein said means for supplying current to said decoder diode comprises a current amplifier including a resistor connected to series with said thermistor.

5. A temperature measuring circuit according to claim 1, including further means for compensation for ambient temperature variations, which further means comprises a diode electrically associated with said means for maintaining a substantially constant voltage across said thermistor to slightly vary the substantially constant voltage as the ambient temperature varies.

6. A linearized temperature measuring circuit comprising:
a temperature sensing thermistor having an exponential resistance-temperature characteristic;
a voltage feedback loop arrangement for maintaining a substantially constant voltage across said thermistor by sensing the voltage thereacross and controlling current therethrough as required to maintain the substantially constant voltage, the magnitude of current required thereby being an exponential function of sensed temperature, said voltage feedback loop arrangement including:
a common circuit reference point;
a reference voltage source;
a first operational amplifier having its non-inverting (+) input connected to said reference voltage source;
the inverting (−) input said first operational amplifier being connected to one terminal of said thermistor to sense the voltage thereof;
the output of said first operational amplifier being connected to said one terminal of said thermistor to supply the required current thereto; and
the other terminal of said thermistor being connected to said common circuit reference point;
a decoder diode having an exponential current-voltage characteristic when forwardly biased; and
means for supplying current to said decoder diode in response to the current through said thermistor, the polarity being such to forwardly bias said decoder diode;
whereby the resultant voltage across said decoder diode is an exponential function of current therethrough, and a substantially linear function of sensed temperature.

7. A temperature measuring circuit according to claim 6, wherein said means for supplying current to said decoder diode comprises said decoder diode being interposed in series between the output of said first operational amplifier and said one terminal of said thermistor, said decoder diode thereby being within the voltage feedback loop so that the voltage drop thereacross does not affect the voltage maintained across said thermistor, and the identical current which flows through said thermistor thereby also flowing through said decoder diode.

8. A temperature measuring circuit according to claim 6, wherein said means for supplying current to said decoder diode comprises a current amplifier which includes:
a first resistor interposed between the output of said first operational amplifier and said one terminal of said thermistor, said first resistor and said thermistor thereby defining a first current path, the current through which being that which is required to maintain a substantially constant voltage across said thermistor;
a second resistor having one terminal connected to the output of said first operational amplifier;
a pass transistor having its collector-emitter circuit interposed in series between the other terminal of said second resistor and one terminal of said decoder diode;
the other terminal of said decoder diode being connected to said common circuit reference point;
said second resistor, said pass transistor collector-emitter circuit, and said decoder diode thereby defining a second current path; and
a second operational amplifier having one of its inputs connected to the other terminal of said second resistor, having the other of its inputs connected to the junction of said first resistor with said thermistor, and having its output connected to the base of said pass transistor, the polarity being such that the effective collector-emitter resistance of said pass transistor is controlled as required to maintain the voltage drop across said second resistor equal to the voltage drop across said first resistor;
whereby, the magnitude of the current through the second path including said decoder diode is equal to the magnitude of current through the first path times the ratio of the resistance of said first resistor to the resistance of said second resistor.

9. A temperature measuring circuit according to claim 8, further comprising:
a reference diode;
a biasing resistor connecting one terminal of said reference diode to a DC supply voltage source to forwardly bias said reference diode; and
the other terminal of said reference diode being connected to said common circuit reference point and thereby connected to said other terminal of said decoder diode, said diodes being connected in like polarity with respect to said common circuit reference point;
said one terminal of said decoder diode and said one terminal of said reference diode together providing differential output terminals of said temperature measuring circuit.

10. A temperature measuring circuit according to claim 9, wherein said reference diode and said decoder diode are formed on a single monolithic chip so that the junction temperature of said reference diode approximately follows the junction temperature of said decoder diode, thereby to provide temperature compensation.

11. A method of linearizing the output of a thermistor having an exponential resistance-temperature characteristic, which method comprises:
sensing voltage across the thermistor;
controlling current through the thermistor as required to maintain the sensed voltage substantially constant; and
supplying current to a forwardly biased decoder diode having an exponential current-voltage characteristic in response to the current through said thermistor;
whereby the resultant voltage across the decoder diode is a substantially linear function of the temperature sensed by the thermistor.

* * * * *